(12) United States Patent
Chinkov et al.

(10) Patent No.: US 9,459,985 B2
(45) Date of Patent: Oct. 4, 2016

(54) BIOS TRACING USING A HARDWARE PROBE

(71) Applicant: INTEL CORPORATION, Santa Clara, CA (US)

(72) Inventors: Alexey Chinkov, Haifa (IL); Pavel Konev, Haifa (IL)

(73) Assignee: Intel Corporation, Santa Clara, CA (US)

(*) Notice: Subject to any disclaimer, the term of this patent is extended or adjusted under 35 U.S.C. 154(b) by 25 days.

(21) Appl. No.: 14/229,679

(22) Filed: Mar. 28, 2014

(65) Prior Publication Data

US 2015/0278070 A1    Oct. 1, 2015

(51) Int. Cl.
*G06F 11/00* (2006.01)
*G06F 11/34* (2006.01)
*G06F 11/36* (2006.01)
*G06F 13/00* (2006.01)

(52) U.S. Cl.
CPC ......... *G06F 11/348* (2013.01); *G06F 11/3419* (2013.01); *G06F 11/3636* (2013.01); *G06F 11/3648* (2013.01); *G06F 13/00* (2013.01)

(58) Field of Classification Search
USPC .......................................................... 714/27
See application file for complete search history.

(56) References Cited

U.S. PATENT DOCUMENTS 8,136,096 B1* 3/2012 Lindahl ................. G06F 11/364
 714/45
2013/0013962 A1* 1/2013 Liang .................... G06F 11/221
 714/43

FOREIGN PATENT DOCUMENTS

WO    2013101560 A    7/2013

* cited by examiner

*Primary Examiner* — Sarai Butler
(74) *Attorney, Agent, or Firm* — Jordan IP Law, LLC (57) ABSTRACT

Methods and apparatuses may provide for tracing the performance of BIOS from the start of its execution. A hardware device such as a hardware probe may be connected to the processor on a target board and used to gather and transfer data to a host computer without resort to a COM port.

16 Claims, 8 Drawing Sheets

BIOS TRACING USING A HARDWARE PROBE

BACKGROUND

The Basic Input/Output System (BIOS) continues to be in widespread use in millions of computer systems as a firmware interface. It may be the very first piece of software that computers built in compliance with Personal Computer (PC) standards (e.g., of IBM Corporation) load and operate when powered up. The BIOS may instruct the computer to initialize basic input/output (I/O) hardware, including keyboard, central processing unit (CPU), memory, and monitor control. It may further be used to boot up the operating system (OS) or a loader for the operating system. The BIOS may be an example of firmware that is stored on a memory chip located on the computer motherboard.

Given the centrality of correct BIOS operation to the subsequent functioning of the computer, an error in the loading or operation of the BIOS may cause other errors in the computer system that may render it unusable. When such errors occur, it may be useful to have some mechanism for identifying them. One approach is to use utilities located within the BIOS itself, but when the problem lies within the BIOS, this approach may be of limited value.

Another approach is to use data recorded in the computer's serial log. This data may be used to debug platform issues. The data may be captured via a serial cable connected to the Communication (COM) port, a serial port interface on PC-compatible computers. This interface, however, is increasingly a legacy port that is not present in newer computers. As a result, an additional board having a COM port may have to be provided in order to capture data from the serial log. Even when a COM port is available, a direct connection to may entail the use of a serial cable to access the data, which itself may present issues of its own in terms of additional expense and limitations on data throughput rate.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

During boot-up of a PC-type computer, the BIOS may generate a serial log file that, in the event of a boot failure, may be useful in ascertaining the reason for that failure. For example, systems provided with a so-called "Debugging Build" of BIOS are known and generate debugging output, and may be favored for use in the design or manufacturing stage of a computer, although BIOS with similar capabilities can be provided on other systems for other purposes or stages as well. The data of the serial log file may be a character file that provides a kind of running commentary on the boot process and contains data useful in debugging should that process fail or otherwise be defective. For example, serial log file may contain error codes generated by the BIOS at boot-up.

Figure 1:
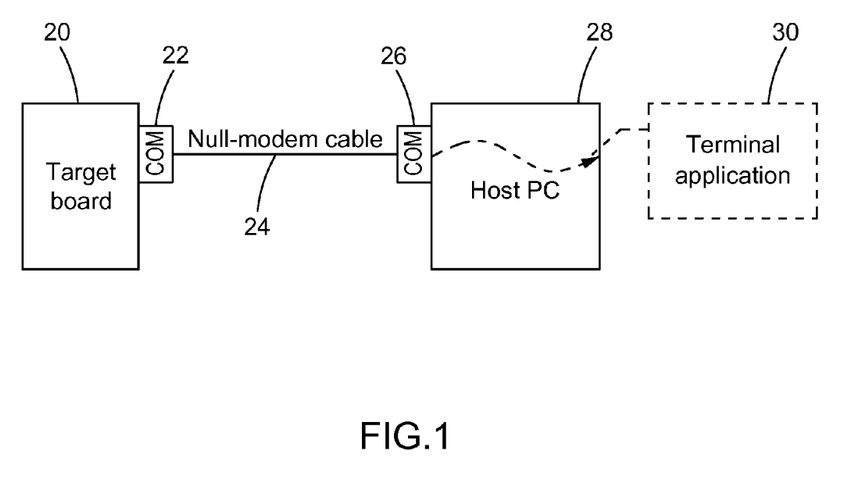
FIG. 1 is a block diagram of an example of a known system by which diagnostic information may be acquired.

Turning to FIG. 1, a target board 20 in a system of interest (the one that is booting up) launches its BIOS, generating a serial log file, which is sent to a COM port 22. The data of the serial log file may be conveyed as a character string to the COM port 22 on the target board 20. The serial log file may then be sent, character-by-character, over a serial cable 24 to a COM port 26 of a host PC 28 that may be running a terminal application 30 that assists in analyzing the serial log file and debugging the BIOS on the target board 20. Examples of commercially available terminal applications suitable for use with embodiments include HyperTerminal by Microsoft® and PuTTY, an open source product that may be used with Windows®. The illustrated serial cable 24 is a null modem cable, and may be more expensive relative to other sorts of cables used in connecting computers together. The serial cable 24 may also be relatively slow, as the COM port provides data transfer speeds substantially less than other ports in computers and other cable arrangements, such as those attainable via USB (Universal Serial Bus, e.g., USB Specification 3.0, Rev. 1.0, Nov. 12, 2008, USB Implementers Forum) protocol ports and cables.

Figure 2:
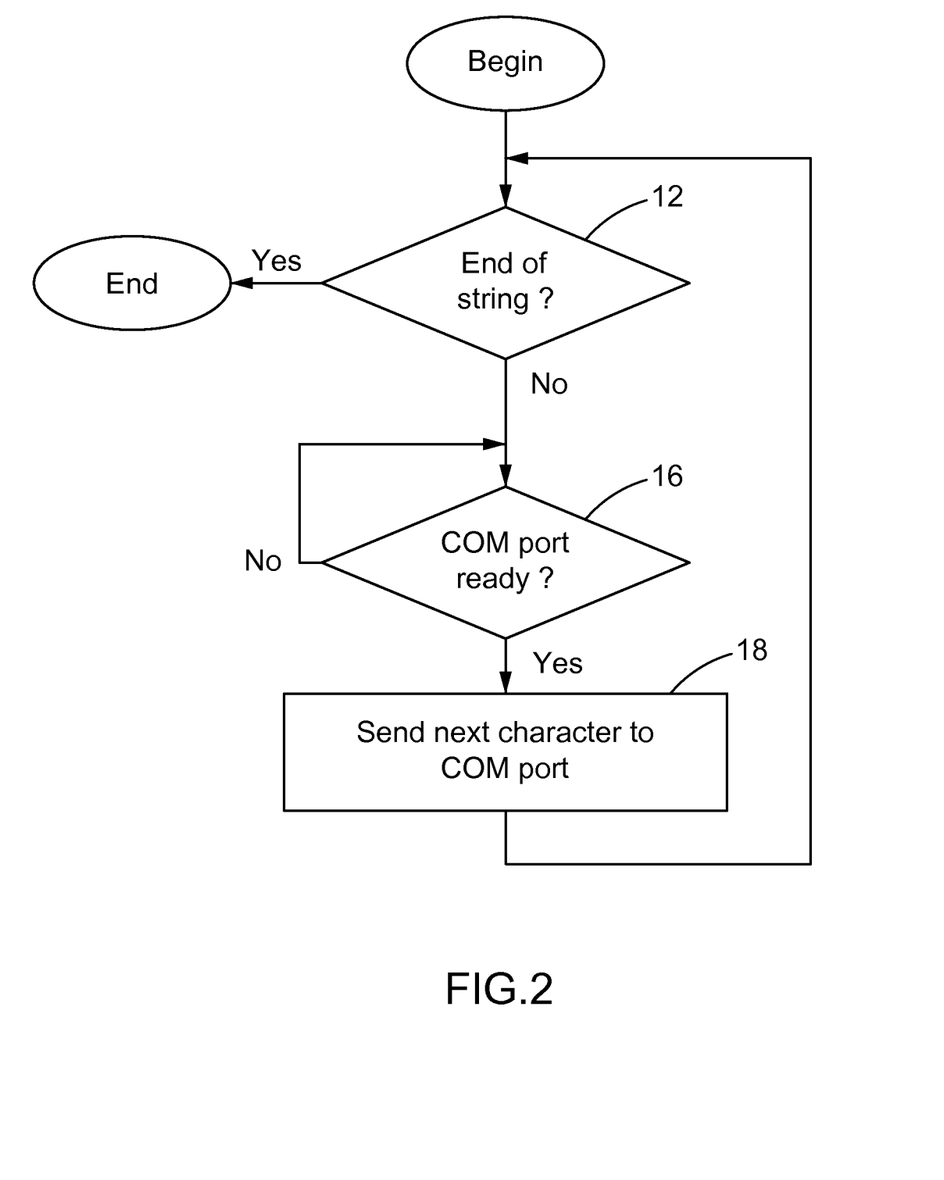
FIG. 2 is a flowchart of an example of a known method of conveying string information to a COM port.

A standard method by which data such as the string data that makes up the serial log file is sent to the COM port by the BIOS is illustrated in FIG. 2. Illustrated block 12 queries whether a string (which may be the serial log file) is at an end and if it is, then there is nothing further to send to the COM port and the process is at an end. If, however, the end of the string has not been reached, then at illustrated block 16 the COM port is polled to determine if it is ready to receive the next character in the string. If it is not, then control loops back around block 16 until the COM port is ready, at which time the next character is sent to the COM port at illustrated block 18 and control loops back to the start of the end-of-string test provided in block 12. Hence, it is seen that the COM port may provide a limit on the speed with which data may be transferred, including data concerning BIOS performance.

Figure 3:
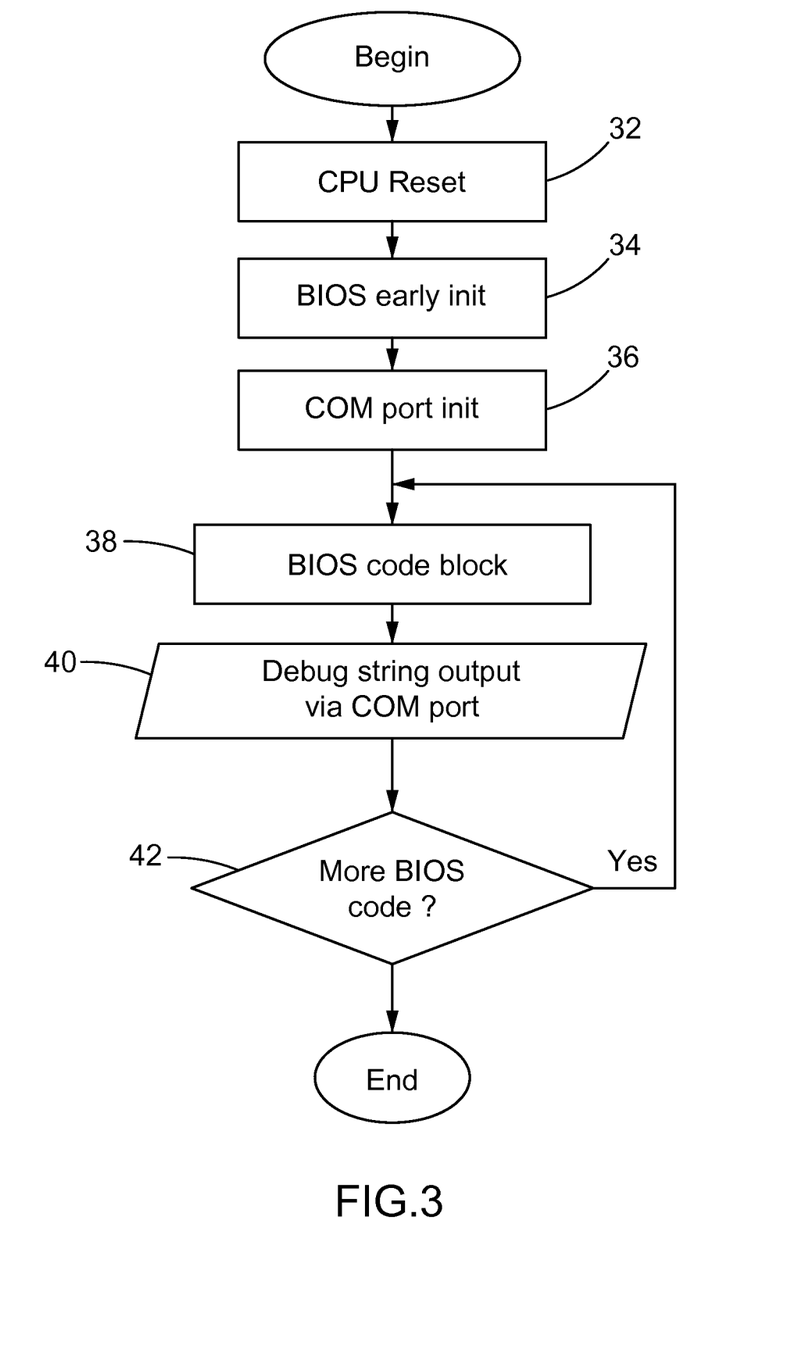
FIG. 3 is a flowchart of an example of a known method of using a COM port to acquire diagnostic information.

One known manner in which a COM port may be used is illustrated in FIG. 3. When a system is turned on, the CPU of the system may be reset at block 32, and the BIOS executes its early initialization steps (e.g. some aspects of chipset initialization) at illustrated block 34. During these early steps, there may be no visibility of the BIOS at the COM port because the COM port has not yet been initialized. A short time later, the COM port may be initialized at block 36, and an additional block of BIOS code is executed at illustrated block 38. The serial log file may begin to be generated at illustrated block 40. If at block 42 it is determined that there is additional BIOS code to execute, then control loops back to block 38, and that additional code is executed. Character-by-character, this process produces the serial log file that is sent to the COM port, subject to the limitations of the process depicted in FIG. 2, in which the COM port may act as a choke point on the throughput speed as has been explained above with reference to FIG. 2.

Figure 4:
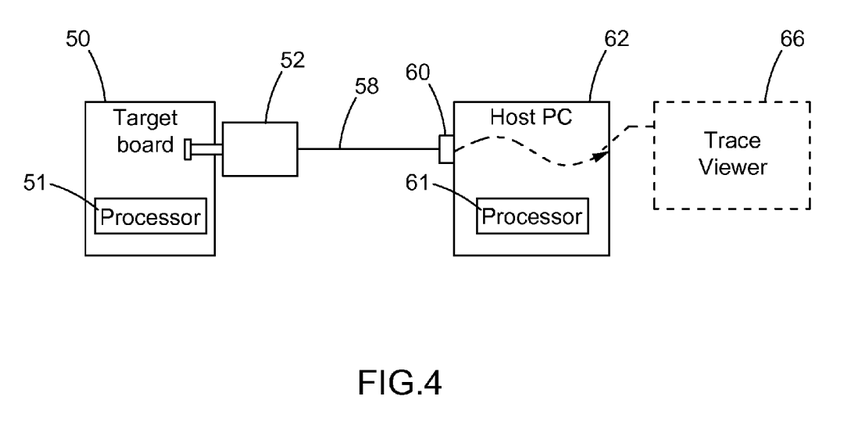
FIG. 4 is a block diagram of an example of a system by which diagnostic information may be acquired according to an embodiment.

FIG. 4 illustrates an example of a configuration by which data may be acquired without having to make use of a serial cable. The illustrated configuration employs a hardware tool known as a hardware probe, which may be a device used in computer hardware and microprocessor design to control and/or monitor a target processor at the register level. A number of commercially available versions of a hardware probe suitable for use here are available, including In Target Probe (ITP) offered by Intel®, and other hardware probes available through Arium® and Lauterbach®. Other common terms by which this hardware is known include "in-circuit debugger," and "Joint Test Action Group (JTAG) probe/debugger with trace." A hardware probe may be physically connected to certain pins on a processor to enable the hardware probe to directly read the results of each processor instruction, including the contents and state of individual registers. In general, a hardware probe may be connected to any pin of interest to facilitate monitoring the internal registers of the processor, as well as specialized debug pins provided to facilitate debugging.

In addition to being able to read the contents of internal registers at a given time, the hardware probe may be able to halt the CPU where desired, control the execution of software, and permit the use of hardware break points as well as software break points, all of which may facilitate the debugging process. A hardware probe may provide access to substantially greater information than may be provided by a serial log file, although it also may provide access to the serial log file as it is being generated. The hardware probe as deployed here may further allow one to monitor the BIOS from the instant it is launched on power-up of a system. In this way, the hardware probe may provide visibility to the BIOS from the moment the hardware probe is connected and begins to run, as it is not dependent on any target board initializations to work. For example, the hardware probe does not require initialization of the COM port on the target board. The hardware probe may thus see earlier in time than a debugging system that reads data from the target board's COM port.

Processor architectures have been developed that further facilitate the use of a hardware probe by gathering such directly accessed data as a hardware probe may collect and conveying that data to a common port to which the hardware probe may be connected. For example, Intel Corporation offers Extended Debug Port (XDP) on certain processors. XDP is a 60 pin small form factor connector port that gathers data from a number of processor pins to a common port for ease of connection to a hardware probe. Additionally, the hardware probe may be used in conjunction with event trace, which may be a type of software or firmware used to facilitate debugging. Such software may permit a hardware probe to monitor execution of software and BIOS without requiring modifications to the code being executed. Occurrences such as interrupts, exceptions, code/data breakpoints and more may be accessed and stored along with time-stamp information. Event trace software may help track code execution paths by showing a trace of events that have occurred. In some embodiments, the event trace software may run on the CPU of the target board (e.g., the "board processor"). One example of commercially available event trace software is Architectural Event Trace (AET) offered by Intel Corporation, which is a CPU feature that may run on the CPU of the target board.

Continuing now with reference to FIG. 4, a target board 50 in a system of interest (i.e., the one that is booting up) launches its BIOS on boot-up, generating a serial log file which may be monitored by a hardware probe 52 via direct connection of the hardware probe 52 to certain pins of a board processor 51 or via an XDP port (not separately shown in FIG. 4) to which the hardware probe 52 may be connected. The data so collected may be conveyed via a standard USB cable 58 to a port 60 (which may be a standard USB port) on a host PC 62, where the information is processed by a host processor 61 and presented on a trace viewer 66. The hardware probe 52, the USB cable and the port 60 may therefore form a linkage between the board processor 51 and the host processor 61, wherein the linkage conveys data concerning the board processor 51 (e.g., states of one or more processor and/or board registers, interrupts, exceptions, code/data breakpoints) to the host processor 61.

Figure 5:
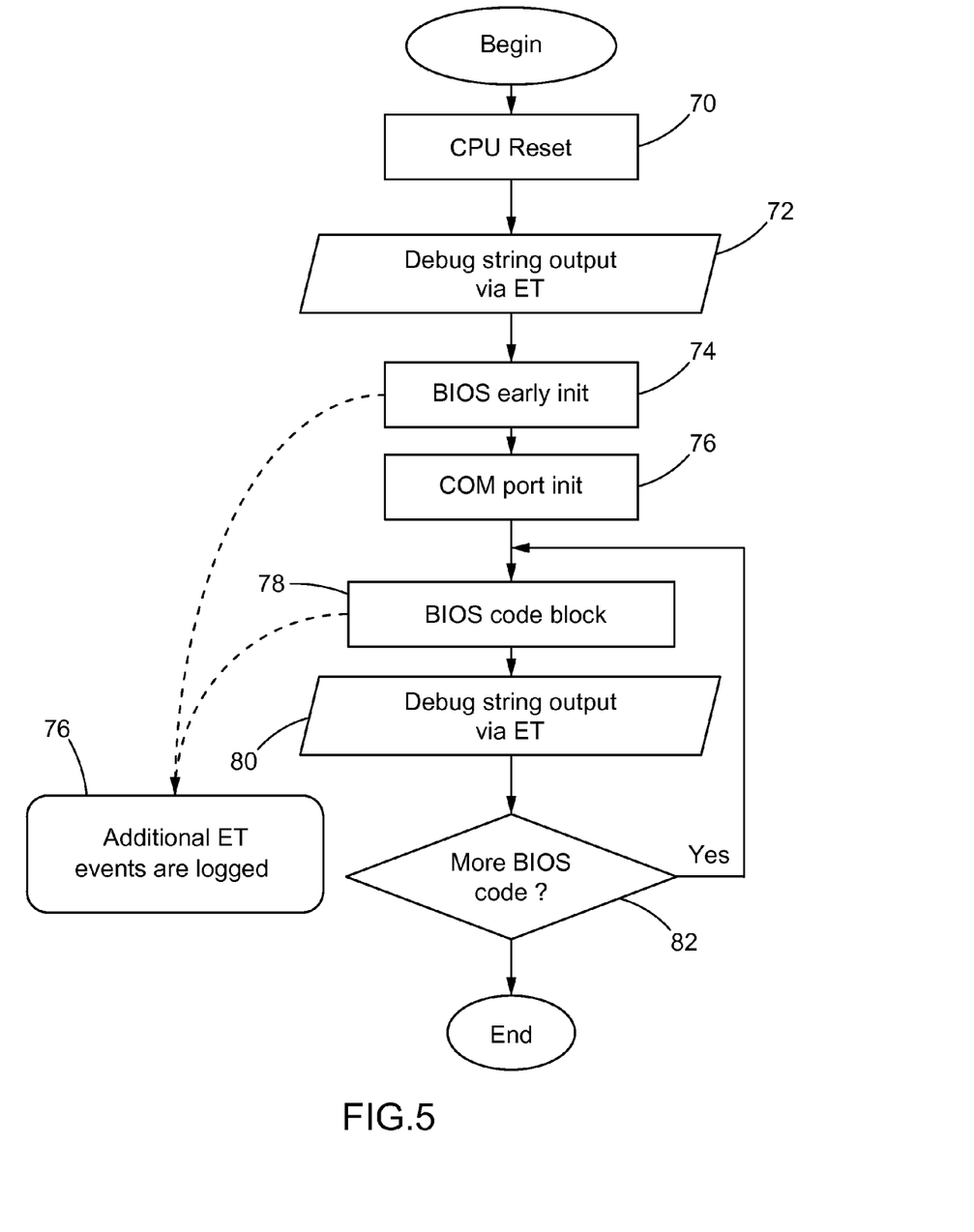
FIG. 5 is a flowchart of an example of a method of acquiring diagnostic information according to an embodiment.

Turning now to the method illustrated by the flowchart in FIG. 5, an example of an implementation to monitor a serial log as well as other events according to an embodiment is shown. At illustrated block 70 the CPU is reset (e.g., as a result of system power-on) and a debug string begins to be created and monitored via the event trace at block 72. Since the hardware probe and event trace require no initializing on the target board to operate, they may provide visibility of the target system from before the start of the BIOS. At illustrated block 74 the BIOS is in the early stages of initialization, and at block 76 the COM port may be initialized. An additional block of BIOS code is executed at illustrated block 78, wherein a debug string may be output at block 80 via the event trace. Various events, including events relating to the BIOS, are logged by the event trace at illustrated blocks 74 and 78. Conditional block 82 checks to see if there is any more BIOS code to run and if so, control passes back to block 78. If there is no additional BIOS code to run, the process ends.

Figure 6:
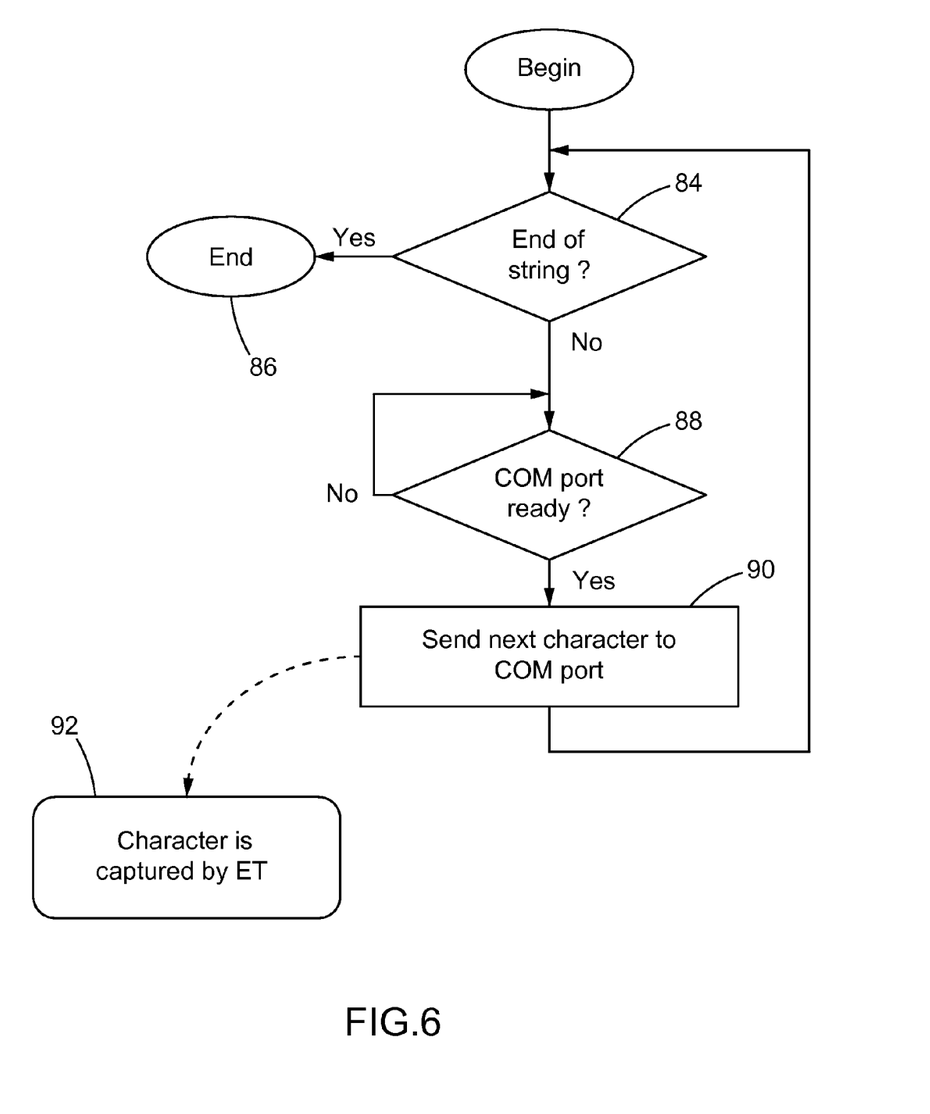
FIG. 6 is a flowchart of an example of a method of obtaining debugging string output according to an embodiment.

The method and system depicted in FIG. 5 therefore allows one to dispense with the use of a serial cable and provides data from the very start of the BIOS, which facilitates debugging that may be required. The use of a hardware probe in conjunction with event trace permits the collection of information in addition to what may be provided by the serial log file. The speed at which the data is captured, however, may be constrained by the manner in which the BIOS feeds data to the COM port, as is illustrated in FIG. 6. More particularly, an end-of-string condition may be tested for at block 84 and if found, the process is at an end. If the string is not at an end, then at illustrated block 88 the system polls the COM port to determine when it is ready to receive the next character. At block 90 when the COM port is available, the next character may be sent to it and captured by the event trace at block 92. Thus, in this arrangement, the speed of operation may be constrained by the need to wait for the COM port to be in a ready state to receive data.

Figure 7:
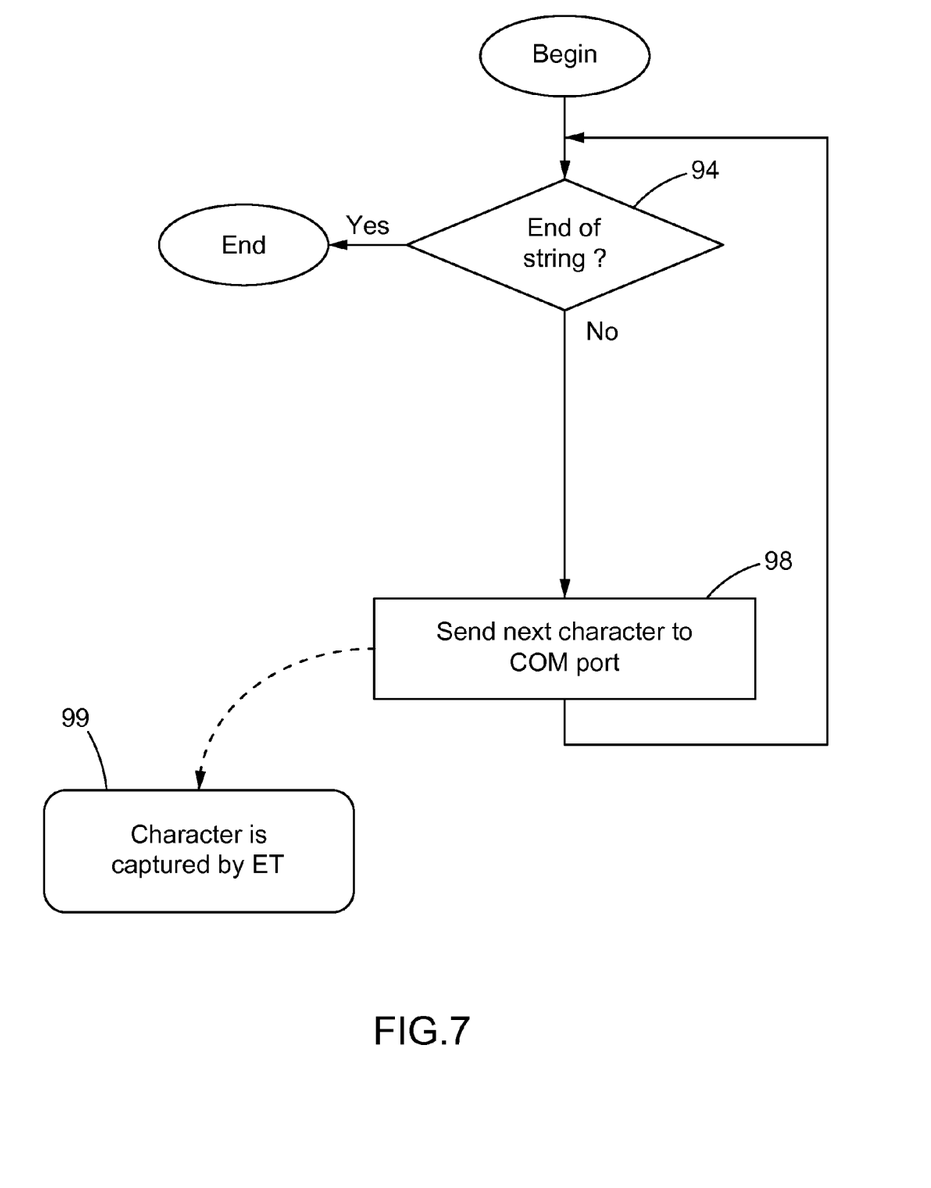
FIG. 7 is a flowchart of an example of a method of obtaining debugging string output according to an additional embodiment.

This limitation on speed may be eliminated by modifying the BIOS code to permit the event trace to capture data without having to poll the state of the COM port. An example of such an approach method is illustrated in FIG. 7. An example of such a modification to some lines of BIOS code to implement the approach is as follows, where the double use of the "/" symbol indicates code that has been commented out:

while ((SerialPortReadRegister (LSR_OFFSET) & LSR_TXRDY==0);
//LSR_OFFSET is COM port base+%
//LSR_TXRDY is bit[5]

Here, an end-of-string condition is tested in block 94 and if there is more data in the string, then the next character is sent to the COM port at 98 whether the COM port is formally ready for the next character or not. This approach is possible because the system does not actually use the COM port to send data from the target board to the host PC, but instead captures it at block 99 via event trace. The illustrated approach therefore eliminates the COM port as a speed bottleneck, and may increase the speed appreciably. In some implementations, the illustrated approach may result in speeds that are several times faster than may be had when using a serial cable and COM port.

The methods illustrated in FIGS. 5-7 may be may be implemented in executable software as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Figure 8:
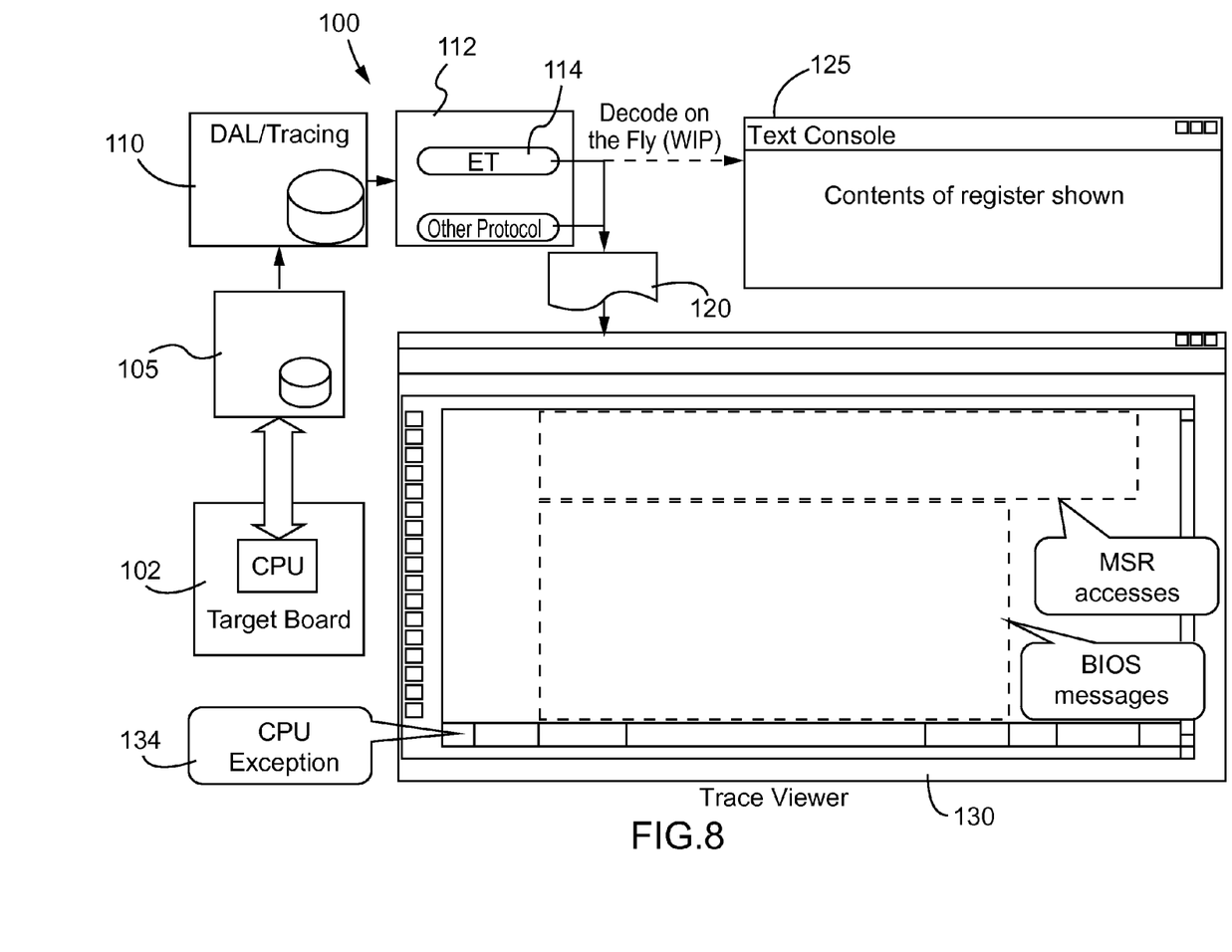
FIG. 8 is a block diagram of an example of a debugging system according to an embodiment.

FIG. 8 is a block diagram of an example 100 of an embodiment. In the illustrated example, a target board 102 has a CPU (e.g., a board processor) and is executing BIOS code. A port 105 may pass data via a hardware probe to a Digital Abstraction Layer (DAL) 110, which used by a software decoder 112 that event tracing software 114 may use to generate a file 120 displayed on a trace viewer 130, here indicating a CPU exception 134. In an alternative embodiment, a text console 125 may display the raw data from the trace. Thus, the hardware probe is linked to the board processor to obtain information/data concerning execution of the BIOS in the illustrated example, wherein the information/data may be collected without polling a COM port of the target board 102.

ADDITIONAL NOTES AND EXAMPLES

Example 1 may include a system to trace a process, comprising a board processor on a target board, a host processor, and a linkage coupled to the host processor, the linkage to convey data concerning the board processor to the host processor, wherein the linkage comprises a hardware probe.

Example 2 may include the system of Example 1, wherein the board processor comprises a Basic Input/Output System (BIOS) stored on the target board, and the hardware probe is linked to one or more pins of the board processor.

Example 3 may include the system of Example 2, further comprising a host computer system and includes the host processor.

Example 4 may include the system of Example 3, wherein the host processor is connected to the hardware probe via a cable that is not a serial cable.

Example 5 may include the system of any of Examples 1-4, wherein the target board has a communications (COM) port and the data is collected without polling the state of the COM port.

Example 6 may include the system of either Examples 2 or 4, wherein the hardware probe accesses one or more registers located on the target board.

Example 7 may include the system of Example 6, further comprising an event trace which is accessed data relating to one or more of the target processor's interrupts, exceptions, register states, or code/data breakpoints.

Example 8 may include the system of Example 3, further comprising a trace viewer on the host computer system.

Example 9 may include the system of any of Examples 1-4, wherein the computer host system accesses a serial log file associated with the target board.

Example 10 may include the system of Example 2, wherein the hardware probe is connected to a port on the target board.

Example 11 may include an apparatus for tracing a process on a processor, comprising a processor on a target board, a hardware probe linked to the processor, and a port to receive data concerning the processor from the hardware probe.

Example 12 may include the apparatus of Example 11, wherein the processor comprises a BIOS stored on the target board, the hardware probe is linked to one or more pins of the processor on the target board to obtain information concerning execution of the BIOS.

Example 13 may include the apparatus of Examples 11 or 12, wherein the target board has a communications (COM) port and the BIOS on the target board permits the collection of data without polling the COM port.

Example 14 may include the apparatus of Example 12, wherein the hardware probe accesses one or more registers located on the target board.

Example 15 may include the apparatus of Example 14, wherein the hardware probe is able to access one or more of the target processor's interrupts, exceptions, or code/data breakpoints.

Example 16 may include the apparatus of Examples 11, 12, 14, or 15, further comprising an event trace.

Example 17 may include a non-transitory computer readable storage medium comprising a set of instructions which, if executed by a processor, cause a computer device to read data concerning the state of a processor located on a target board, and convey said data to a host system via a hardware probe and an event trace.

Example 18 may include the non-transitory computer readable storage medium of Example 17, wherein the data relates to the performance of a BIOS on the target board.

Example 19 may include the non-transitory computer readable storage medium of Example 18, wherein the instructions, if executed, cause the data to be sent to a host system without using a serial port on the target board.

Example 20 may include a method of debugging a process running on a processor on a target board, comprising establishing a connection between a hardware probe and a processor on a target board, reading information from the processor that is relevant to the process, conveying said information from the probe to a host system, and analyzing said information to debug the process.

Example 21 may include the method of Example 20, wherein the process comprises a BIOS stored on the target board.

Example 22 may include the method of either of Examples 20 or 21, wherein the hardware probe is linked to one or more pins of the processor on the target board.

Example 23 may include the method of Example 22, further comprising establishing a cable connection between the target board and the host system that does not use a serial cable.

Example 24 may include the method of Example 20, wherein the target board has a communications COM port and the BIOS on the target board permits the collection of data without polling the state of the COM port.

Example 25 may include a method of debugging the operation of a system BIOS running on a target board, comprising establishing a connection between a hardware probe and a processor on a target board, using the hardware probe to read information from the processor, transmitting said information from the hardware probe to a separate computer system, and analyzing the data on the separate computer system.

Example 26 may include the method of Example 25, wherein the separate computer system includes tracing software.

Example 27 may include the method of Example 25, wherein information is conveyed from the target board to the separate computer system via a cable that is not a serial cable.

Example 28 may include the method of Example 25, wherein the processor of the target board has event tracing capability.

Example 29 may include the method of Example 25, wherein a Universal Serial Bus (USB) cable is used to transmit information from the hardware probe to the separate computer system.

Example 30 may include the method of Example 25, wherein BIOS polling of the COM port is disabled.

Example 31 may include a method of debugging BIOS on a processor located on a target board, comprising resetting a processor on a target board, using event tracing software to generate string data concerning the operation of the processor, commencing execution of BIOS on the processor, logging events relating to the BIOS and thereby creating a log, and outputting the log to a hardware probe.

Example 32 may include the method of Example 31, further comprising conveying the log to a separate computer system.

Example 33 may include the method of Example 32, wherein the separate computer system has a trace viewer.

Example 34 may include the method of Example 31, including logging events not related to the BIOS.

Example 35 may include the method of Examples 31-34, comprising disabling BIOS polling of a COM port that is located on the target board.

Example 36 may include an apparatus to debug a process on a target processor, comprising means for acquiring data concerning the operation of that process from the target processor, and means for conveying that data to a separate system via a cable that is not a serial cable.

Example 37 may include the apparatus of Example 36, wherein the data is stored in a serial log file.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A system to trace a Basic Input/Output (BIOS) process, comprising:
    a target processor on a target board, the target processor including a BIOS stored on the target board;
    a host processor; and
    a linkage coupled to the host processor, the linkage to convey data concerning the target processor and the BIOS process to the host processor, wherein the linkage comprises a hardware probe that is linked to one or more pins of the target processor.

2. The system of claim 1, further comprising a host computer system that is connected to the hardware probe and includes the host processor.

3. The system of claim 2, wherein the host computer system is connected to the hardware probe via a cable that is not a serial cable.

4. The system of claim 1, wherein the target board has a communications (COM) port and the data is collected without polling a state of the COM port.

5. The system of claim 1, wherein the hardware probe accesses one or more registers located on the target board.

6. The system of claim 5, further comprising an event trace by which is accessed data relating to one or more of the target processor's interrupts, exceptions, register states, or code/data breakpoints.

7. The system of claim 2, further comprising a trace viewer on the host computer system.

8. The system of claim 1, wherein the host computer system accesses a serial log file associated with the target board.

9. The system of claim 1, wherein the hardware probe is connected to a port on the target board.

10. An apparatus for tracing a BIOS process on a processor, comprising:
    a processor on a target board, wherein the processor includes a BIOS stored on the target board;
    a hardware probe linked to one or more pins of the processor on the target board to obtain information concerning execution of the BIOS; and
    a port to receive data concerning the processor from the hardware probe.

11. The apparatus of claim 10, wherein the target board has a communications (COM) port and the BIOS on the target board permits the collection of data without polling the COM port.

12. The apparatus of claim 10, wherein the hardware probe is able to access the state of registers located on the processor.

13. The apparatus of claim 12, wherein the hardware probe is able to access one or more of the target processor's interrupts, exceptions, or code/data breakpoints.

14. The apparatus of claim 10, further comprising an event trace.

15. A non-transitory computer readable storage medium comprising a set of instructions which, if executed by a processor, cause a computer device to:
    read data concerning the state of a processor located on a target board; and
    convey said data to a host system via a hardware probe and an event trace,
    wherein the data relates to the performance of a BIOS on the target board.

16. The non-transitory computer readable storage medium of claim 15, wherein the instructions, if executed, cause the data to be sent to a host system without using a serial port on the target board.

* * * * *